US006665758B1

(12) United States Patent
Frazier et al.

(10) Patent No.: US 6,665,758 B1
(45) Date of Patent: Dec. 16, 2003

(54) SOFTWARE SANITY MONITOR

(75) Inventors: Ralph E. Frazier, Suwanee, GA (US); Denis M. Blanford, Duluth, GA (US); William M. Belknap, Lawrenceville, GA (US); Theodore Heske, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/411,497

(22) Filed: Oct. 4, 1999

(51) Int. Cl.$^7$ ............................................. G06F 12/00
(52) U.S. Cl. ................... 710/200; 710/262; 713/502; 714/55; 714/38; 717/126; 717/127; 709/102; 709/107
(58) Field of Search ................. 710/210, 260, 710/262, 266; 713/502; 714/2, 47, 48, 55, 38, 44; 717/124, 126, 127; 709/102, 107

(56) References Cited

U.S. PATENT DOCUMENTS

| | | | |
|---|---|---|---|
| 5,278,976 A | | 1/1994 | Wu |
| 5,341,497 A | * | 8/1994 | Younger ........................ 714/51 |
| 5,522,040 A | * | 5/1996 | Hofsass et al. ............... 714/55 |
| 5,655,083 A | * | 8/1997 | Bagley ......................... 714/23 |
| 5,864,663 A | * | 1/1999 | Stolan .......................... 714/55 |
| 6,145,103 A | * | 11/2000 | Typaldos et al. ............. 714/55 |
| 6,269,478 B1 | * | 7/2001 | Lautenbach-Lampe et al. ................ 717/127 |
| 6,393,433 B1 | * | 5/2002 | Kalavade et al. ........... 707/200 |

OTHER PUBLICATIONS

English translation of German Patent EP 0 584 512 A1, Publication date Mar. 2, 1994.

* cited by examiner

*Primary Examiner*—Sumati Lefkowitz
*Assistant Examiner*—X. Chung-Trans
(74) *Attorney, Agent, or Firm*—Lowe Hauptman Gilman & Berner, LLP; Paul W. Martin

(57) ABSTRACT

Disclosed is a Software Sanity Monitor for automatically detecting and remedying software lock-up conditions without user intervention. Users often refer to these conditions as "hangs" or "forever loops". Although the Software Sanity Monitor uses the operating software's information, it is designed to execute independent of the operating system software; thereby, eliminating reliance on a "sane" operating system. If a "hang" condition is detected, the Software Sanity Monitor will automatically restart the system after logging the failure and, optionally, notify the user or host system.

19 Claims, 9 Drawing Sheets

SOFTWARE SANITY MONITOR

FIELD OF THE INVENTION

The present invention relates generally to the automatic detection and remedy of software lock-up conditions of a computer system without human intervention, and more specifically, to the use of watchdog timers to initiate the automatic detection and remedy.

BACKGROUND OF THE INVENTION

Many computer systems incorporate watchdog timers to recover from lock-up conditions. Some microprocessors are programmed with this capability. A watchdog timer basically works by being restarted often enough such that it does not expire unless there is either a lock-up condition in the code or the code did not restart the timer within the watchdog timer duration. Watchdog timers are fairly simple to use, but require the programmer to "hit" the watchdog timer during routines which can take a significant amount of time.

Accordingly, there is a need in the art for a watchdog timer that automatically detects conditions leading to a lock-up condition of the computer system and remedies such conditions, thereby preventing a computer system lock-up without human intervention.

SUMMARY OF THE INVENTION

It is, therefore, an object of the present invention to provide a method and apparatus for automatically detecting conditions leading to a lock-up condition of the computer system and remedying such conditions to prevent a computer system lock-up.

It is another object of the present invention to provide a method and apparatus for automatically detecting conditions leading to a lock-up condition of the computer system which operates independently from the operating system of the computer system.

The purpose of Software Sanity Monitor according to the present invention is to automatically detect and remedy software lock-up conditions without user intervention. Users often refer to these conditions as "hangs" or "forever loops". Although the Software Sanity Monitor uses the operating software's information, it is designed to execute independent of the operating system software; thereby, eliminating reliance on a "sane" operating system. If a "hang" condition is detected, the Software Sanity Monitor will automatically restart the system after logging the failure and, optionally, notify the user or host system.

The Software Sanity Monitor is designed for, but not limited to, devices not having console input. The Software Sanity Monitor is designed to run in an operating environment where programs vary in run-time priority. In addition, the Software Sanity Monitor is designed to run in operating environments where any proportion of the programs may have the same run-time priority. The Software Sanity Monitor design does not apply to environments that are solely "time-sliced". Although the Software Sanity Monitor is designed to detect whether or not the system software is running properly, it does not determine whether or not any particular program is producing proper results.

These and other objects of the present invention are achieved by a computer-implemented method of preventing a computer system lock-up including starting a first timer. A second timer is monitored and it is determined when the second timer periodic time interval elapses. Operating software scheduling information of the computer system is sampled to verify lower priority programs have continued to run. If the lower priority programs have continued to run, the first timer is restarted such that the first timer does not interrupt the computer system. The second timer is restarted. If lower priority programs have not continued to run, the first timer is allowed to expire and interrupt the computer system. Control of the computer system is then taken by a monitoring program.

The foregoing and other objects of the present invention are achieved by an article including a computer readable medium having stored thereon a plurality of sequences of instructions, said plurality of sequences of instructions including sequences of instructions which, when executed by a processor, cause said processor to perform the steps of starting a first timer. A second timer is monitored and it is determined when the second timer periodic time interval elapses. Operating software scheduling information of the computer system is sampled to verify lower priority programs have continued to run. If the lower priority programs have continued to run, the first timer is restarted such that the first timer does not interrupt the computer system. The second timer is restarted. If the lower priority have not continued to run, the first timer is allowed to expire and interrupt the computer system. Control of the computer system is taken by a monitoring program.

The foregoing and other objects of the present invention are achieved by a computer architecture including starting means for starting a first timer. Monitoring means monitor a second timer and it is determined when the second timer periodic time interval elapses. Sampling means sample Operating software scheduling information of the computer system to verify lower priority programs have continued to run. If the lower priority programs have continued to run, the first timer is restarted such that the first timer does not interrupt the computer system. The second timer is restarted. If the lower priority programs have not continued to run, the first timer is allowed to expire and interrupt the computer system. Control of the computer system is taken by a monitoring program.

The foregoing and other objects of the present invention are achieved by a computer system including a processor and a memory coupled to the processor, the memory having stored therein sequences of instructions, which, when executed by the processor, causes the processor to perform the steps of starting a first timer. A second timer is monitored and it is determined when the second timer periodic time interval elapses. Operating software scheduling information of the computer system is sampled to verify lower priority programs have continued to run. If the lower priority programs have continued to run, the first timer is restarted such that the first timer does not interrupt the computer system. The second timer is restarted. If the lower priority have not continued to run, the first timer is allowed to expire and interrupt the computer system. Control of the computer system is taken by a monitoring program.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for automatically detecting and remedying software lock-up conditions of a computer system without human intervention are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
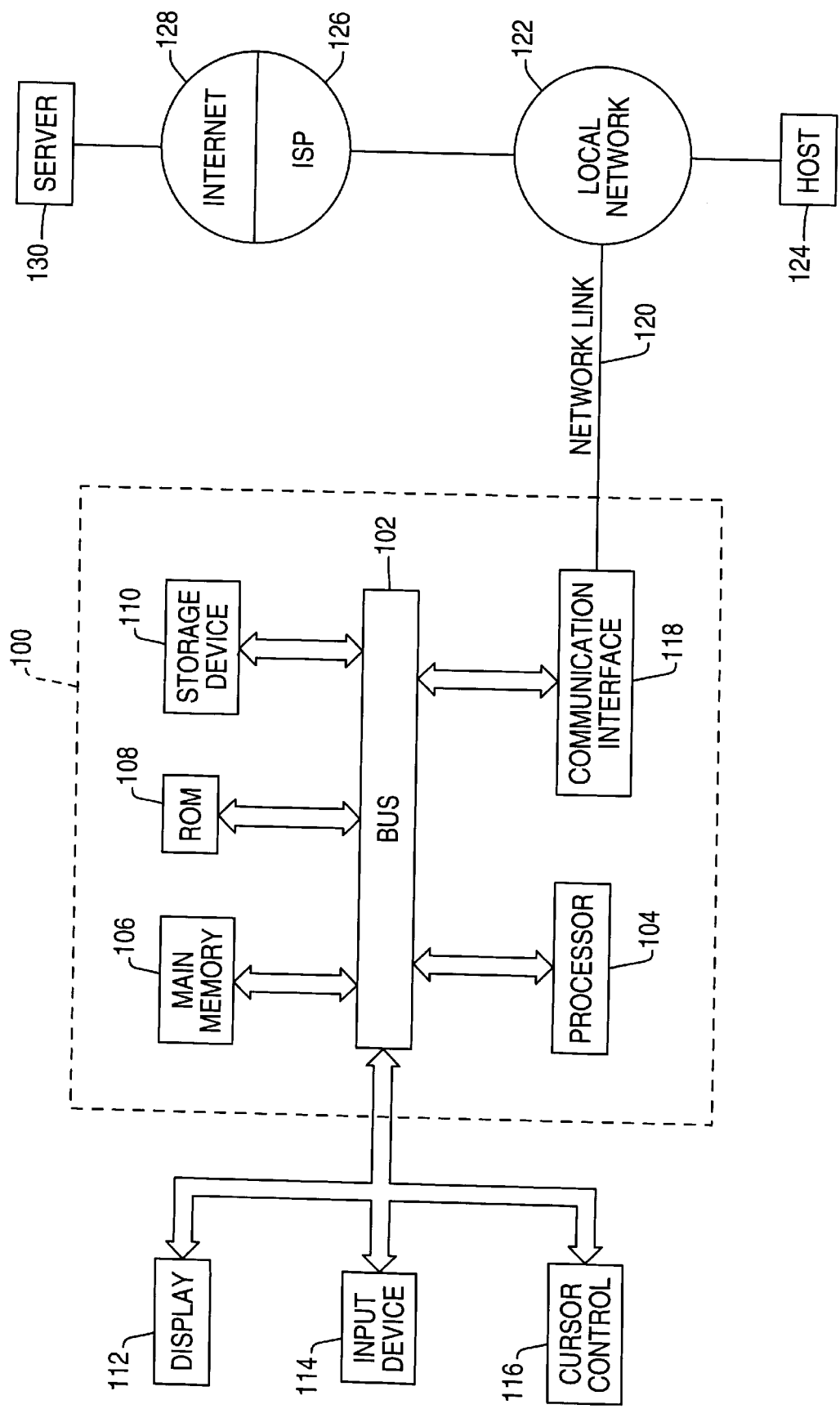
FIG. 1 is a high level block diagram of a computer architecture usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to automatically detect and remedy software lock-up conditions of a computer system without human intervention. According to one embodiment of the invention, automatic detection and remedy of software lock-up conditions of a computer system without human intervention is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 118 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the unmaskable interrupt of the critical timer. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

The Software Sanity Monitor of the present invention monitors the operating software's program scheduling control behavior. The program scheduling control behaviors are:

Program scheduling

Program switching

Program preemption

All other program scheduling techniques

The following definitions are used herein:

The operating software can be either an operating system or an operating application.

Programs are applications, tasks, or processes that execute within the operating software environment.

Run-time priority is the inherent importance of a program's scheduling and execution relative to other programs in the system. The operating software uses the run-time priority to determine which program to execute on the computer device.

Scheduling Information can be a count(s), a variable(s), or a system structure(s) the operating software updates and maintains in conjunction with the scheduling of a program.

Idle loop refers to a point, a program, or a routine executed when the system is inactive. In this condition, the system is not busy, or it is performing low-level background diagnostics. The idle loop is exited when an event occurs triggering the operating software to run another program.

Blocking is the action a program performs to relinquish control of the computer back to the operating software. The program blocks while waiting for an event to occur.

Program preemption is an action performed by the operating software suspending a program such that control is given to another program with a higher run-time priority.

System initialization is the process of starting the operating software and all initial programs of the system.

A Sane System is declared when programs continue to run in descending run-time priority or the idle loop is reached with interrupts enabled.

An Insane System is declared when lower run-time priority programs have not run within the critical timer duration or the system reaches the idle loop with interrupts disabled.

The Software Sanity Monitor evaluates the operating software's scheduling information to determine whether or not the system software is executing properly. The evaluation logic is based on the facts that as long as the system continues to run a lower priority program, the system is considered sane. One implication of system sanity is the operating software must eventually run the idle loop. Preemption of a program by a higher run-time priority program does not satisfy the Software Sanity Monitor's sanity evaluation. The Software Sanity Monitor's sanity evaluation will be satisfied when a program having lower priority than the preempted program is run or the system idle loop is reached.

To perform the evaluation, the Software Sanity Monitor utilizes a minimum of two hardware timer interrupts to gain control over the operating system of the computer system on which the Software Sanity Monitor is resident. One of these timers must be separate from the system's interval timer/clock hardware as either a built-in or external hardware clock. The separate clock's hardware must provide an unmaskable interrupt. The Software Sanity Monitor defines this separate timer as the critical timer. The other timers used by the Software Sanity Monitor may be maskable and are not required to be separate from the system's interval timer/clock hardware. These other timers are defined as routine timers. The duration of routine timers should be less than half the duration of the critical timer. The Software Sanity Monitor evaluation logic is the Interrupt Service Routine code that receives control after one of the described timer/clock hardware interrupts the system. The Software Sanity Monitor's routine timers and critical timer are first started during system initialization.

The Software Sanity Monitor's evaluation is performed in a minimum of two phases. The first evaluation is performed after a defined routine timer's periodic time interval elapses. The Software Sanity Monitor samples the operating software's scheduling information to verify that lower priority programs have continued to run. If lower priority programs have continued to run, the Software Sanity Monitor restarts the critical timer such that the critical timer does not interrupt the system. Afterwards, the Software Sanity Monitor restarts the appropriate routine timers and waits, i.e., blocks, until the next routine timer interval.

If lower run-time priority programs have not run within a routine timer interval, the Software Sanity Monitor recognizes the situation as a potential "system hung" condition. In this event, the Software Sanity Monitor allows the subsequent critical timer to expire and, thereby, it interrupts the system. Control is given to the Software Sanity Monitor as a result of the critical timer interrupt. The Software Sanity Monitor samples the scheduling information and performs a final, second phase, evaluation of the system's sanity. If lower run-time priority programs have not run by this time or the system has reached the idle loop with interrupts disabled, the Software Sanity Monitor declares a failure and performs the necessary notifications and system recovery.

The Software Sanity Monitor treats the idle loop as a unique situation. Normally, the system is considered sane when the computer system remains in the idle loop. The exception is the case where the system is in the idle loop and interrupts are disabled. If this situation occurs, the routine timer(s) will not interrupt. Consequently, the first phase of the Software Sanity Monitor will not occur, however, this situation will not prevent the occurrence of Software Sanity Monitor's second evaluation phase. Since the critical timer is unmaskable, the Software Sanity Monitor's second phase evaluation will be performed.

The Software Sanity Monitor does not assume a failure as long as lower run-time priority programs continue to execute or the idle loop is reached (with interrupts enabled) within a maximum period. If interrupts are disabled while executing the idle loop, the unmaskable second timer will expire causing the Software Sanity Monitor to gain control. The System Sanity Monitor recognizes the idle loop is running with interrupts disabled. Consequently, it declares the system "insane" and initiates the necessary notifications and system recovery. The maximum period is defined as the sum of all routine timers and the critical timer. The Software Sanity Monitor's evaluation is a cyclic procedure. The Software Sanity Monitor tracks a low run-time priority mark until the idle loop is reached. When the idle loop is reached, the low run-time priority mark is reset. This reaction permits the Software Sanity Monitor to adjust the low run-time priority mark with the priority of the first program running after the idle loop. Another cycle is started when another program is run. From that event forward, the Software Sanity Monitor resumes its monitoring of system sanity. The Software Sanity Monitor remains passive while lower run-time priority programs continue to run within the defined time period.

Specific Implementation

The Software Sanity Monitor includes Real-Time Operating System (RTOS) kernel (operating software). In conjunction with the RTOS, the Software Sanity Monitor performs system sanity evaluation.

The Software Sanity Monitor hardware provides two timers. The first timer (routine timer) is a two-second maskable interrupt and the other (critical timer) is a five-second unmaskable interrupt. The processing of the two-second timer includes the verification that a task switch has occurred since the last two-second interval. The five-second timer is used to trigger logic that performs final sanity verification. The five-second timer ensures that the two-second timer is enabled, and the five-second timer performs the recovery action when a failure ("hang") is detected.

All processing occurs in the Interrupt Service Routine (ISR) to accommodate the remote possibility that the RTOS kernel itself is involved in a "hang" condition.

The Software Sanity Monitor confirms that the system software is running by verifying that either (1) switching to lower run-time priority tasks is continuously occurring in the RTOS, or that (2) the Null Task is running with interrupts enabled (idle loop). This implies the RTOS is operational as long as lower run-time priority tasks are getting scheduled to run by means other than restoration from preemption. The RTOS kernel updates a global field, the Task Switch Schedule Count, whenever a task switch to a lower run-time priority task occurs. The Task Switch Schedule Count contains the value of the lowest run-time priority for the current evaluation cycle. When the Software Sanity Monitor gains control following either a routine or critical timer interrupt, its system sanity logic compares the Task Switch Schedule Count to the earlier lowest run-time priority value. When the previous lowest run-time priority value is greater than the new Task Switch Schedule Count, the system is considered sane.

The RTOS Task Switch Schedule Count will not be incremented because of a preemption or when an ISR schedules a task. The kernel will increment the RTOS Task Switch Schedule Count after a higher priority task exits allowing or scheduling a lower run-time priority task to run.

The Software Sanity Monitor checks the RTOS Task Switch Schedule Count to verify a task switch has occurred since the last watchdog interval period. It saves the RTOS Task Switch Schedule Count and Current Task in the Last Task Save Area within the Software Sanity Monitor data segment.

The Software Sanity Monitor initialization processing includes set-up of the critical and routine timers and initialization of data structures including the Last Task Save Area. In addition, the Start-up Code writes to the Software Sanity Monitor mapped I/O location after every Software Sanity Monitor rest or power-up. An RTOS Object Initialization routines also writes to the Software Sanity Monitor mapped I/O location since the Software Sanity Monitor Start-up Code can be avoided by a soft reset command.

As long as interrupts are enabled, the Two-Second Watchdog Timer Processing will occur. In the event that interrupts are permanently disabled, the Five-Second Watchdog Timer Processing will ultimately occur since the five-second interrupt cannot be masked. The following is a summary of the functions for the Two-Second Watchdog Timer Processing, the Five-Second Watchdog Timer Processing, Failure Processing, and Recovery Processing.

Two-Second Watchdog Timer Processing

The two-second Watchdog Timer restarts the Two-Second Watchdog Timer. The two-second Watchdog Timer compares the RTOS Task Switch Schedule Count and Current Task with the information saved in the Last Task Save Area.

If the values are different, the Software Sanity Monitor updates the Last Task Area with the new lowest run-time priority value and new Current Task.

If the Null Task is the Current task (idle loop), the Software Sanity Monitor resets Last Task Save Area with the highest run-time priority value to allow the next evaluation cycle to commence. The Software Sanity Monitor restarts the Five-Second Watchdog Timer and ends. If the values are the same and the Null Task is not the Current Task, the Software Sanity Monitor waits for the five-second timer to expire.

Five-Second Watchdog Timer Processing

The five-second Watchdog Timer checks for a previous failure condition as discussed in detail below. If a failure condition is indicated, Recovery Processing is performed. Otherwise, the five-second Watchdog Timer compares the RTOS Task Switch Schedule Count and Current Task with the information saved in the Last Task Save Area. If the values are different, the Software Sanity Monitor updates the Last Task Save Area with the new lowest run-time priority value and new Current Task. The Software Sanity Monitor restarts the Five-Second Watchdog Timer and ends. If the values are the same, the five-second Watchdog Timer declares a failure ("hang") and it invokes Failure Processing.

The five-second Watchdog Timer will not be permitted to expire because as long as interrupts are enabled, the Two-Second Watchdog Timer Processing will prevent the Five-Second Watchdog Processing from running.

Failure/Recovery Processing

A watchdog timer data area is marked with a failure. The Software Sanity Monitor updates or logs the failure save area (RAM and/or Flash ROM and/or external device), with the appropriate failure data. After the failure data has been recorded, the Software Sanity Monitor performs a system reset. This causes the entire RTOS to restart.

The Five-Second Watchdog Timer logic does not need to consider the situation where the Null Task is running with interrupts disabled. As long as the values in the RTOS Task Switch Schedule Count and the Last Task Save Area are the same, it must be declared a failure. The Two-Second Watchdog Timer prevents the expiration of five-second timer when the Null Task is running with interrupts enabled.

Figure 2:
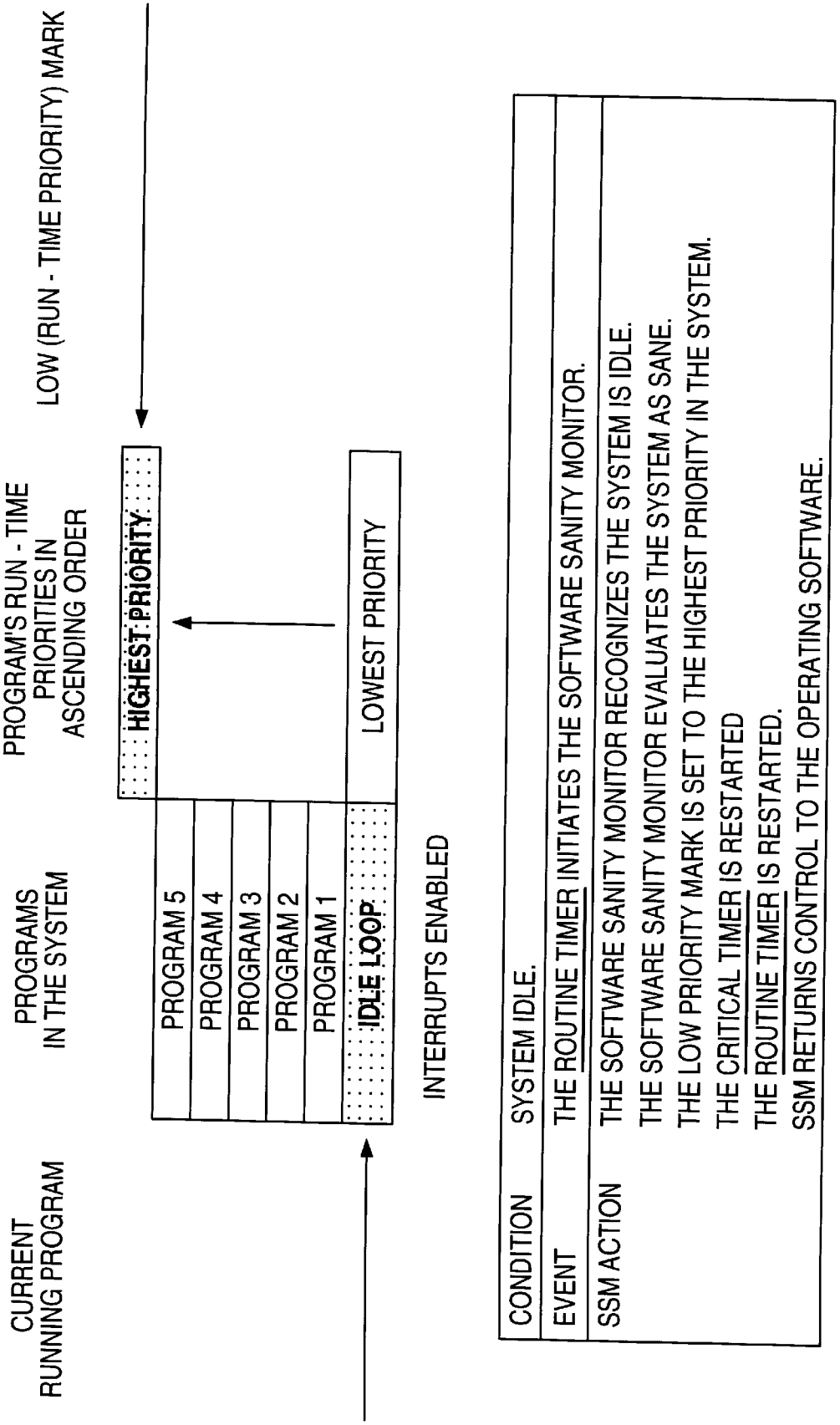
FIGS. 2–9 are examples illustrating the functionality of the present invention.

As depicted in FIG. 2, there are five programs in the system with program 5 being the highest priority program and the idle loop being the lowest priority task. The interrupts for the operating system are enabled. The condition of the operating system is that the system is idle. The routine timer initiates the Software Sanity Monitor. The Software Sanity Monitor recognizes the system as idle. The Software Sanity Monitor evaluates the system as sane. The low priority mark is set to the highest priority in the system. The critical timer is restarted. The routine timer is restarted and the Software Sanity Monitor returns control to the operating software.

Figure 3:
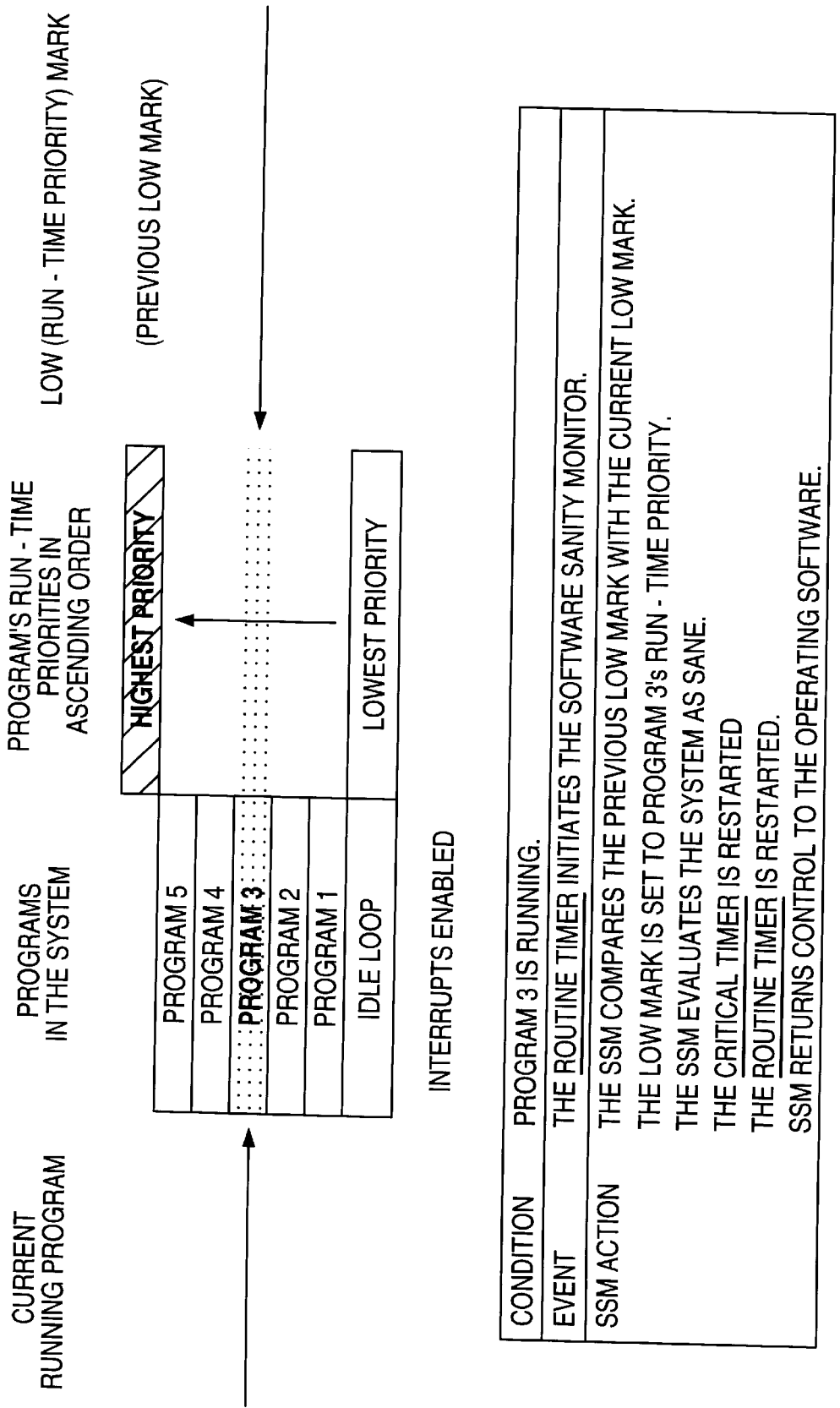

FIG. 3 is identical to FIG. 2, except that program 3 is running. The routine timer initiates the Software Sanity Monitor. The Software Sanity Monitor compares the previous low mark with the current low mark. The low mark is set to program 3 as run-time priority. The Software Sanity Monitor evaluates the system as sane. The critical timer is restarted. The routine timer is restarted and the Software Sanity Monitor returns control to the operating software.

Figure 4:
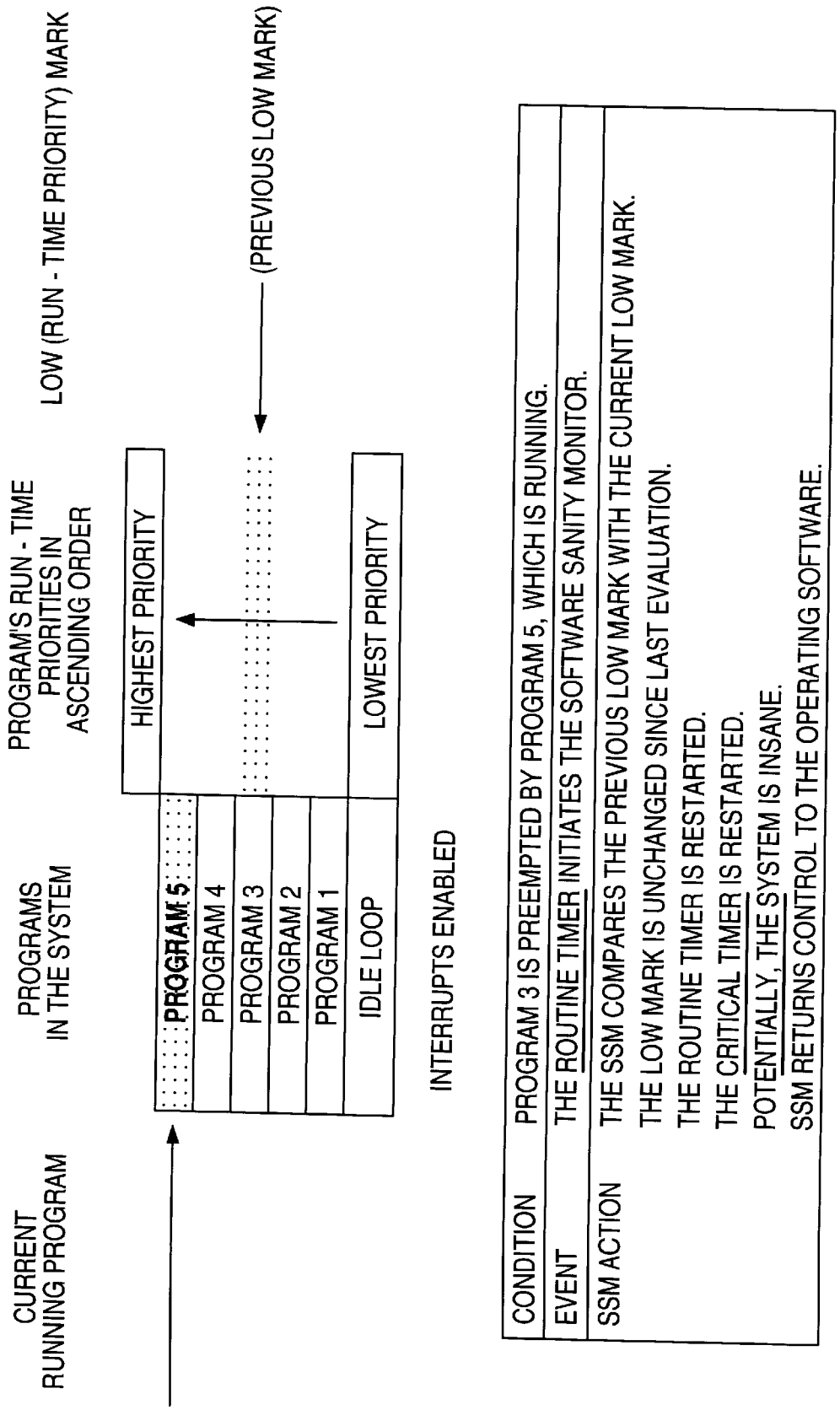

In FIG. 4, program 3 is pre-empted by program 5. Program 5 begins to run. The routine timer initiates the Software Sanity Monitor. The Software Sanity Monitor compares the previous low mark with the current low mark. The low mark is unchanged since the last evaluation. The routine timer is restarted. The critical timer is not restarted. Potentially, the system is insane. The Software Sanity Monitor returns control to the operating software.

Figure 5:
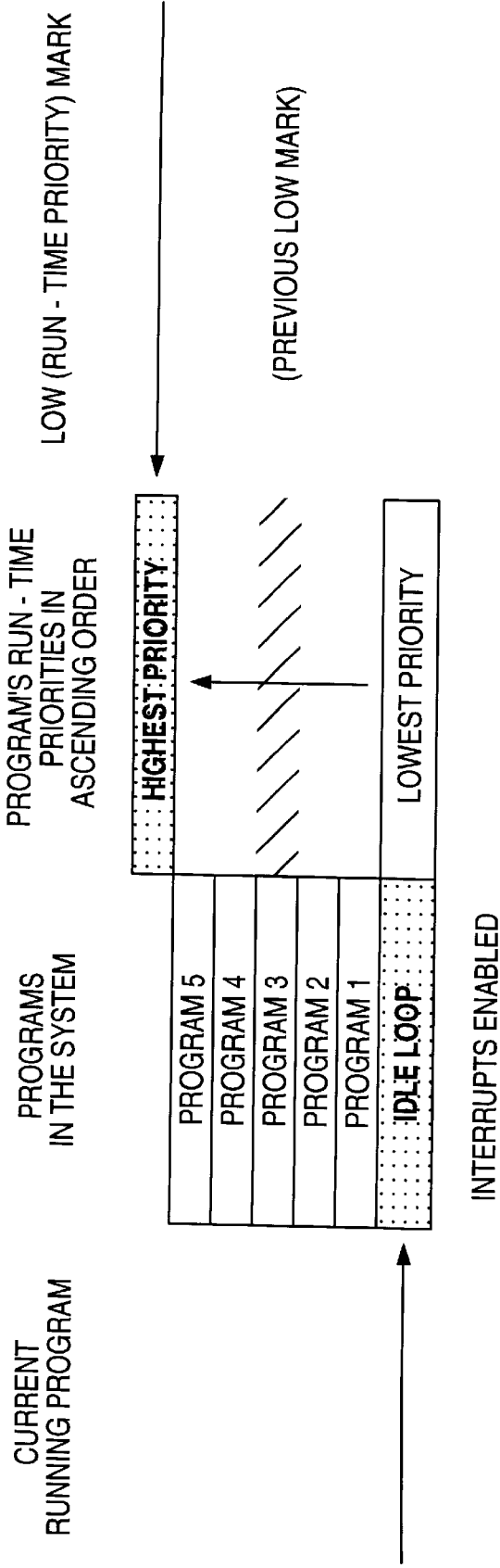

In FIG. 5, program 5 is blocked so that program 3 is reinstated and program 3 blocks. The routine timer initiates the Software Sanity Monitor. The Software Sanity Monitor recognizes the system as idle. The Software Sanity Monitor evaluates the system as sane. The low priority mark is set to the highest priority in the system. The critical timer is restarted. The routine timer is restarted and the Software Sanity Monitor returns control to the operating software.

Figure 6:
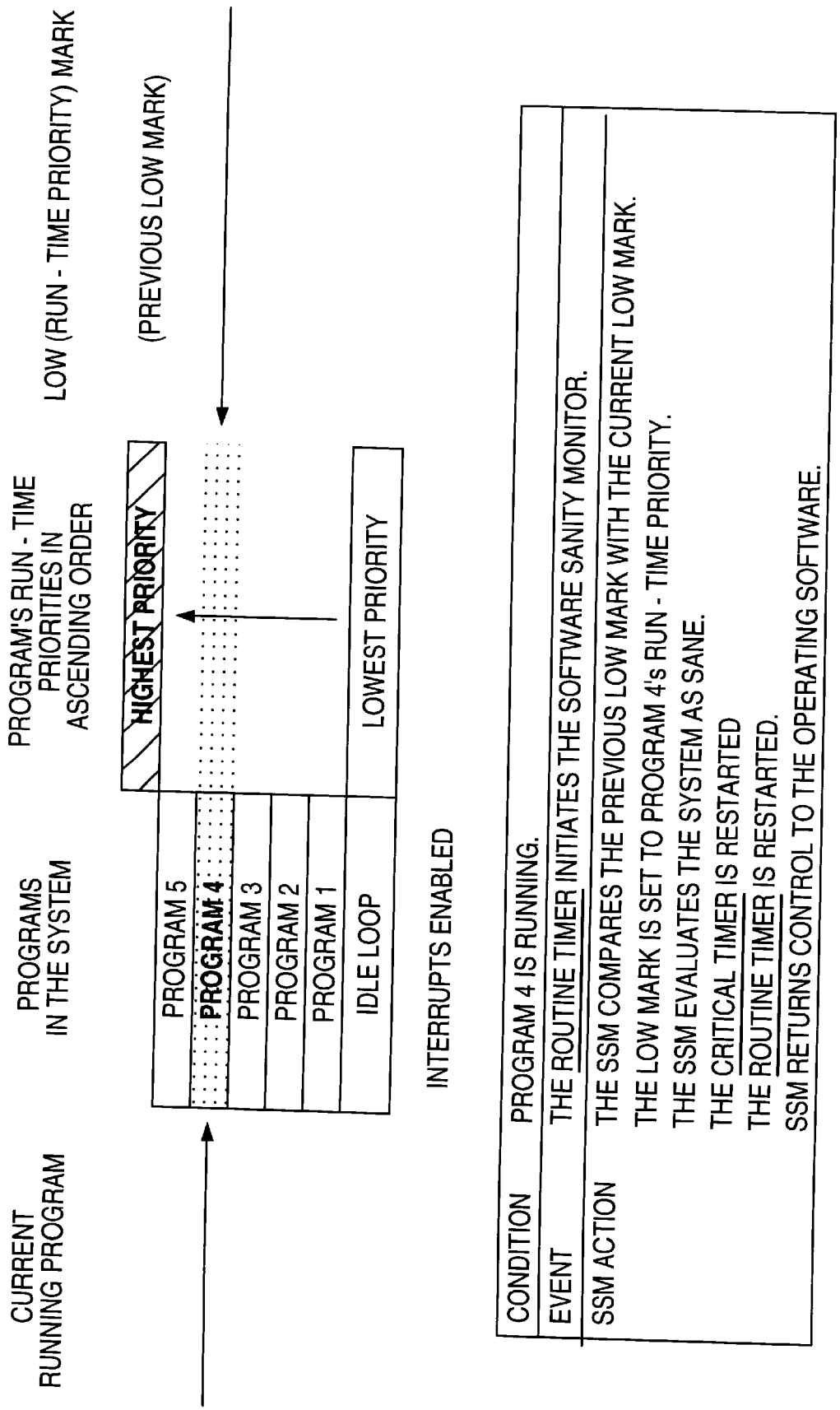

As depicted in FIG. 6, program 4 is running. The routine timer initiates the Software Sanity Monitor. The Software Sanity Monitor compares the previous low mark with the current low mark. The low mark is set to program 4 as run-time priority. The Software Sanity Monitor evaluates the system as sane. The critical timer is restarted. The routine timer is started and the Software Sanity Monitor returns control the operating software.

Figure 7:
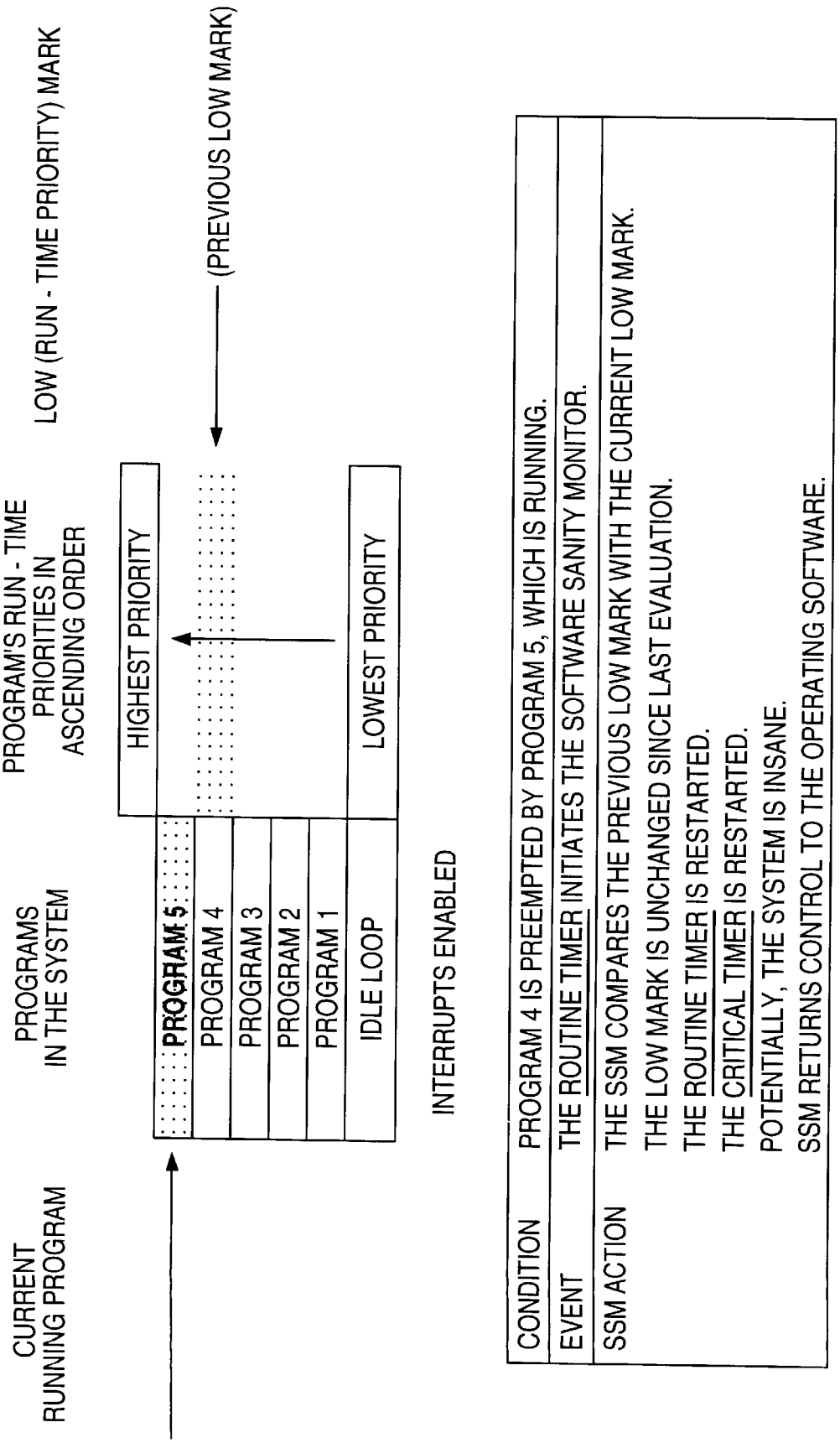

A six example is depicted in FIG. 7. In FIG. 7, program 4 is pre-empted by program 5, which is running. The routine timer initiates the Software Sanity Monitor. The Software Sanity Monitor compares the previous low mark with the current low mark. The low mark is unchanged since the last evaluation. The routine timer is restarted. The critical timer is not restarted. Potentially, the system is insane. The Software Sanity Monitor returns control to the operating software.

Figure 8:
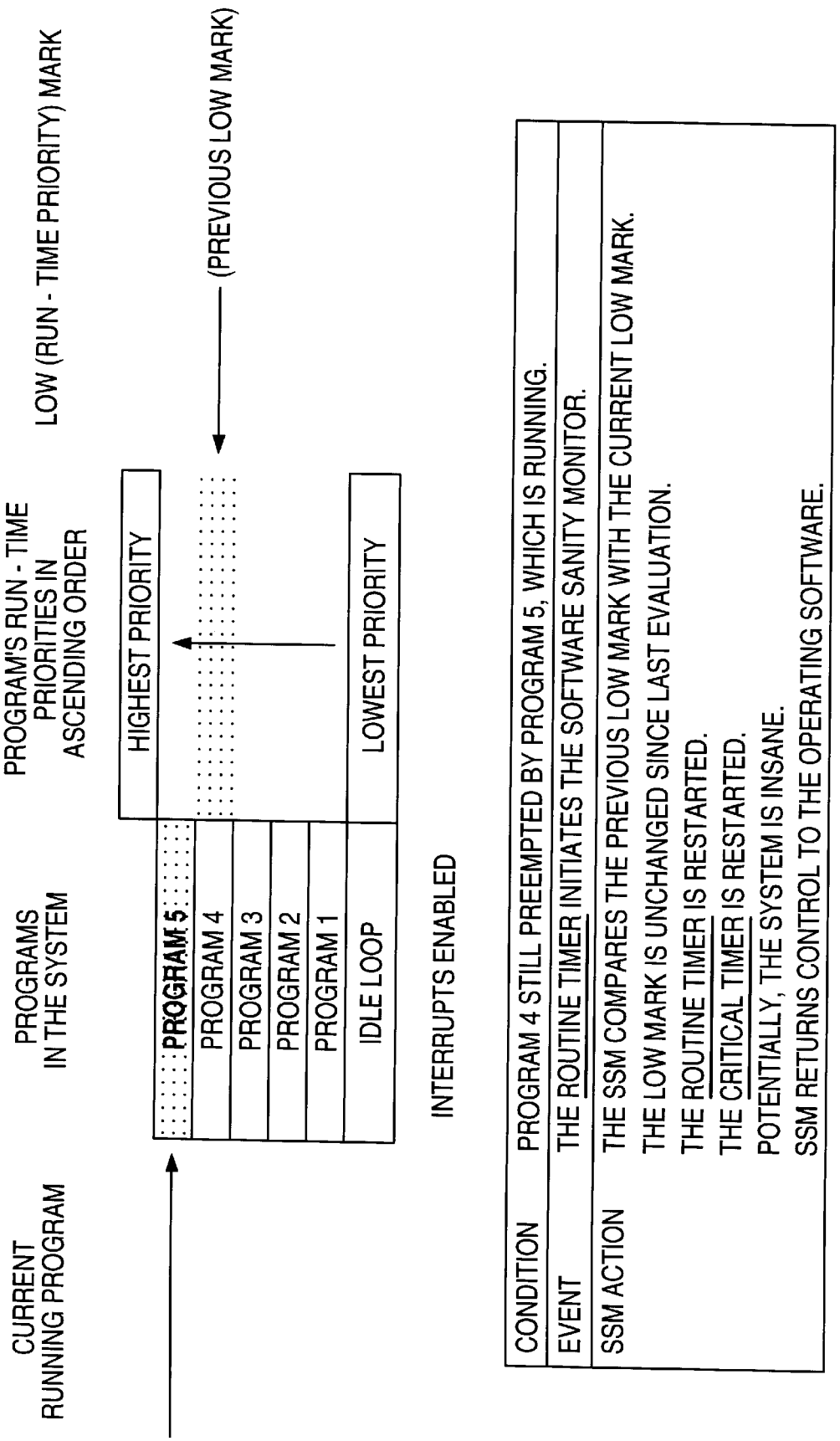

A seventh example is depicted in FIG. 8. Program 4 is still pre-empted by program 5. Program 4 is running. The routine timer initiates the Software Sanity Monitor. The Software Sanity Monitor compares the previous low mark with the current low mark. The low mark is unchanged since the last evaluation. The routine timer is restarted. The critical timer is not restarted. Potentially, the system is insane. The Software Sanity Monitor returns control to the operating software.

Figure 9:
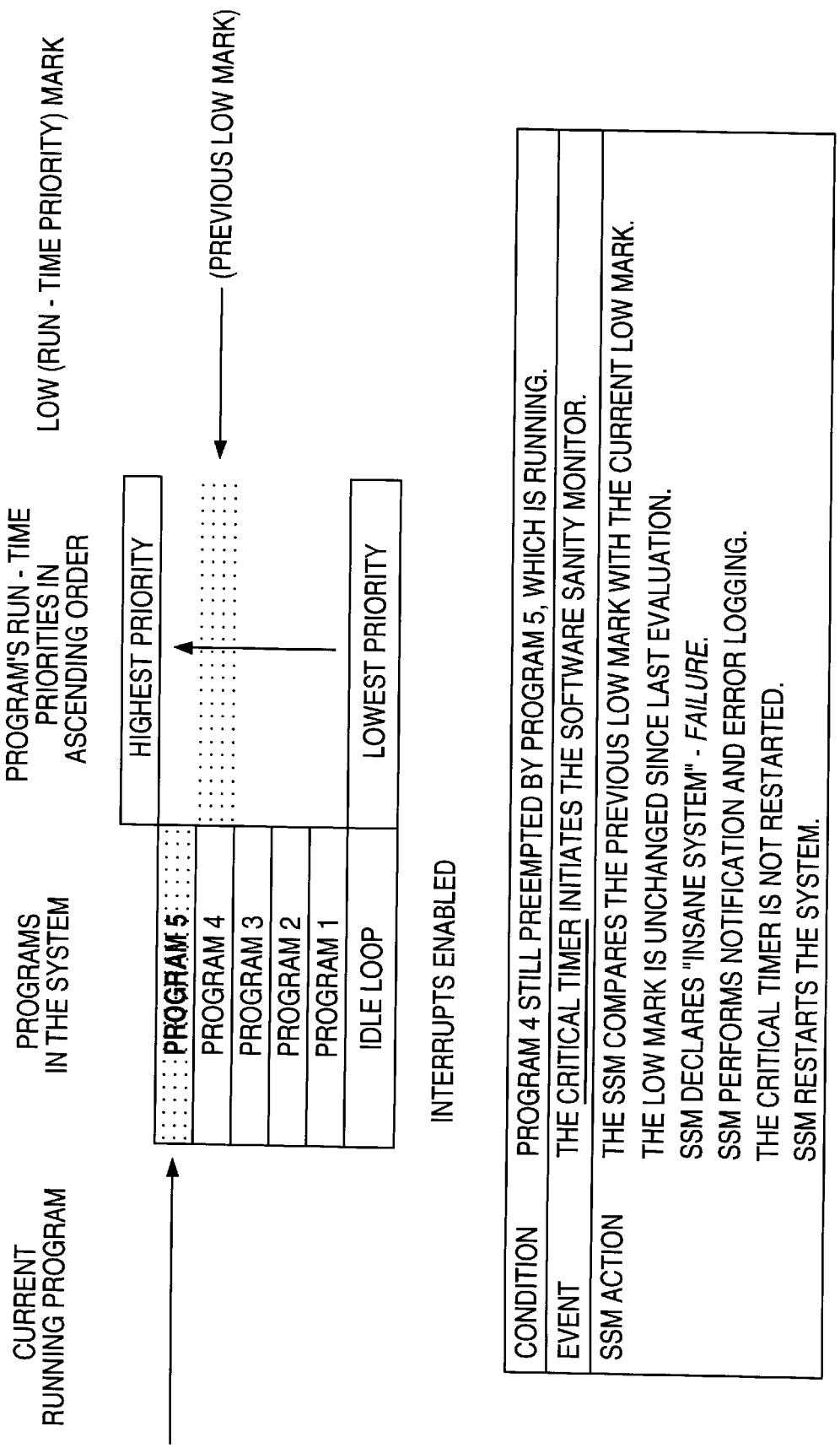

An eighth example is depicted in FIG. 9. Program 4 is still pre-empted by program 5. Program 5 is running. The critical timer initiates the Software Sanity Monitor. The Software Sanity Monitor compares the previous low mark with the current low mark. The low mark is unchanged since the last evaluation. The Software Sanity Monitor declares "insane system"—failure. The Software Sanity Monitor performs notification and error logging. The critical timer is not restarted. The Software Sanity Monitor restarts the system.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer-implemented method of preventing a computer system lock-up, comprising:

starting a first timer;

monitoring a second timer and determining when the second timer periodic time interval elapses;

sampling operating software scheduling information of the computer system to verify lower priority programs have continued to run;

if the lower priority programs have continued to run, restarting the first timer such that the first timer does not interrupt the computer system;

restarting the second timer;

if the lower priority programs have not continued to run, allowing the first timer to expire and interrupt the computer system; and taking control of the computer system by a monitoring program.

2. The method of claim 1, wherein the first timer is separate from a clock of the computer system, and the first timer provides an unmaskable interrupt.

3. The method of claim 1, comprising starting the first timer upon computer system initialization.

4. The method of claim 1, wherein the second timer is not separate from a clock of the computer system, and the second timer provides a maskable interrupt.

5. The method of claim 1, comprising subsequent to said taking step, sampling the scheduling information, and if it is determined the lower priority programs have not run or the computer system has reached an idle loop, performing a system recovery.

6. The method of claim 1, comprising determining the computer system is in an idle loop and interrupts are disabled.

7. The method of claim 6, determining the computer system is properly functioning by determining lower priority programs continue to execute or the idle loop is reached within a predetermined maximum time period.

8. The method of claim 7, wherein the predetermined maximum time period is defined as the sum of the second timer and the first timer.

9. The method of claim 1, comprising a low run-time priority mark.

10. The method of claim 9, comprising resetting the low run-time priority mark when the idle loop is reached.

11. The method of claim 1, wherein said taking step is performed by a Software Sanity Monitor.

12. The method of claim 1, wherein the monitoring program executes independently of the operating system of the computer system.

13. The method of claim 12, comprising logging any instances where the monitoring program has taken control due to the operating system becoming insane.

14. The method of claim 1, comprising updating a global field whenever the operating system switches to a lower run-time priority program from a higher run-time priority program.

15. The method of claim 14, comprising checking a task switch schedule count for the next lowest run-time priority.

16. The method of claim 15, comprising incrementing the task switch schedule count after a higher priority task exits allowing or scheduling a lower run-time priority task to run.

17. The method of claim 1, wherein the first timer has evaluation logic which is interrupt service routine code.

18. An article including a computer readable medium having stored thereon a plurality of sequences of instructions, said plurality of sequences of instructions including sequences of instructions which, when executed by a processor, cause said processor to perform the steps of:

starting a first timer;

monitoring a second timer and determining when the second timer periodic time interval elapses;

sampling operating software scheduling information of the computer system to verify lower priority programs have continued to run;

if the lower priority programs have continued to run, restarting the first timer such that the first timer does not interrupt the computer system;

restarting the second timer;

if the lower priority programs have not continued to run, allowing the first timer to expire and interrupt the computer system; and taking control of the computer system by a monitoring program.

19. A computer system, comprising:

a processor; and a memory coupled to said processor, the memory having stored therein sequences of instructions, which, when executed by said processor, causes said processor to perform the steps of:

starting a first timer;

monitoring a second timer and determining when the second timer periodic time interval elapses;

sampling operating software scheduling information of the computer system to verify lower priority programs have continued to run;

if the lower priority programs have continued to run, restarting the first timer such that the first timer does not interrupt the computer system;

restarting the second timer;

if the lower priority programs have not continued to run, allowing the first timer to expire and interrupt the computer system; and taking control of the computer system by a monitoring program.

\* \* \* \* \*